United States Patent [19]

Tysver

[11] 4,028,775
[45] June 14, 1977

[54] APPARATUS FOR INSERTING A SIZING DISC INTO A TUBULAR CASING

[75] Inventor: Oliver Joseph Tysver, Flossmoor, Ill.

[73] Assignee: Union Carbide Corporation, New York, N.Y.

[22] Filed: May 4, 1976

[21] Appl. No.: 682,958

[52] U.S. Cl. .................................. 17/49; 17/33; 17/39; 53/258; 141/312; 426/105
[51] Int. Cl.[2] .......................................... A22C 7/00
[58] Field of Search .......................... 17/33, 35–38, 17/39, 42, 41, 45, 49; 53/254, 257, 258, 261, 262, 255, 259; 141/312, 316, 390; 100/179, 183, 124, 180; 426/105, 138, 410, 414

[56] References Cited

UNITED STATES PATENTS

| | | | |
|---|---|---|---|
| 1,395,967 | 11/1921 | Merli et al. .............................. | 17/35 |
| 2,946,166 | 7/1960 | Baxter .............................. | 53/258 X |
| 2,999,270 | 9/1961 | Knapp .............................. | 17/35 |
| 3,011,297 | 12/1961 | McDevitt .............................. | 53/261 |
| 3,290,841 | 12/1966 | Sartore .............................. | 53/258 |
| 3,457,588 | 7/1969 | Myles et al. .............................. | 17/35 X |
| 3,503,180 | 3/1970 | Myles et al. .............................. | 53/258 |
| 3,603,059 | 9/1971 | Carnes et al. .............................. | 53/258 |
| 3,864,494 | 2/1975 | Kupcikevicius et al. ....... | 426/410 X |
| 3,975,795 | 8/1976 | Kupcikevicius et al. .............. | 17/41 |

Primary Examiner—John F. Pitrelli
Assistant Examiner—Paul J. Hirsch
Attorney, Agent, or Firm—Clement J. Vicari

[57] ABSTRACT

Apparatus and method for implanting a sizing disc into an open unshirred end of a shirred tubular casing wherein the sizing disc is larger in diameter than the inflated unshirred end of the casing. The invention provides means for the uniform contacting and local stretching of unshirred casing that surrounds the disc as the disc advances through the unshirred end of the casing.

24 Claims, 12 Drawing Figures

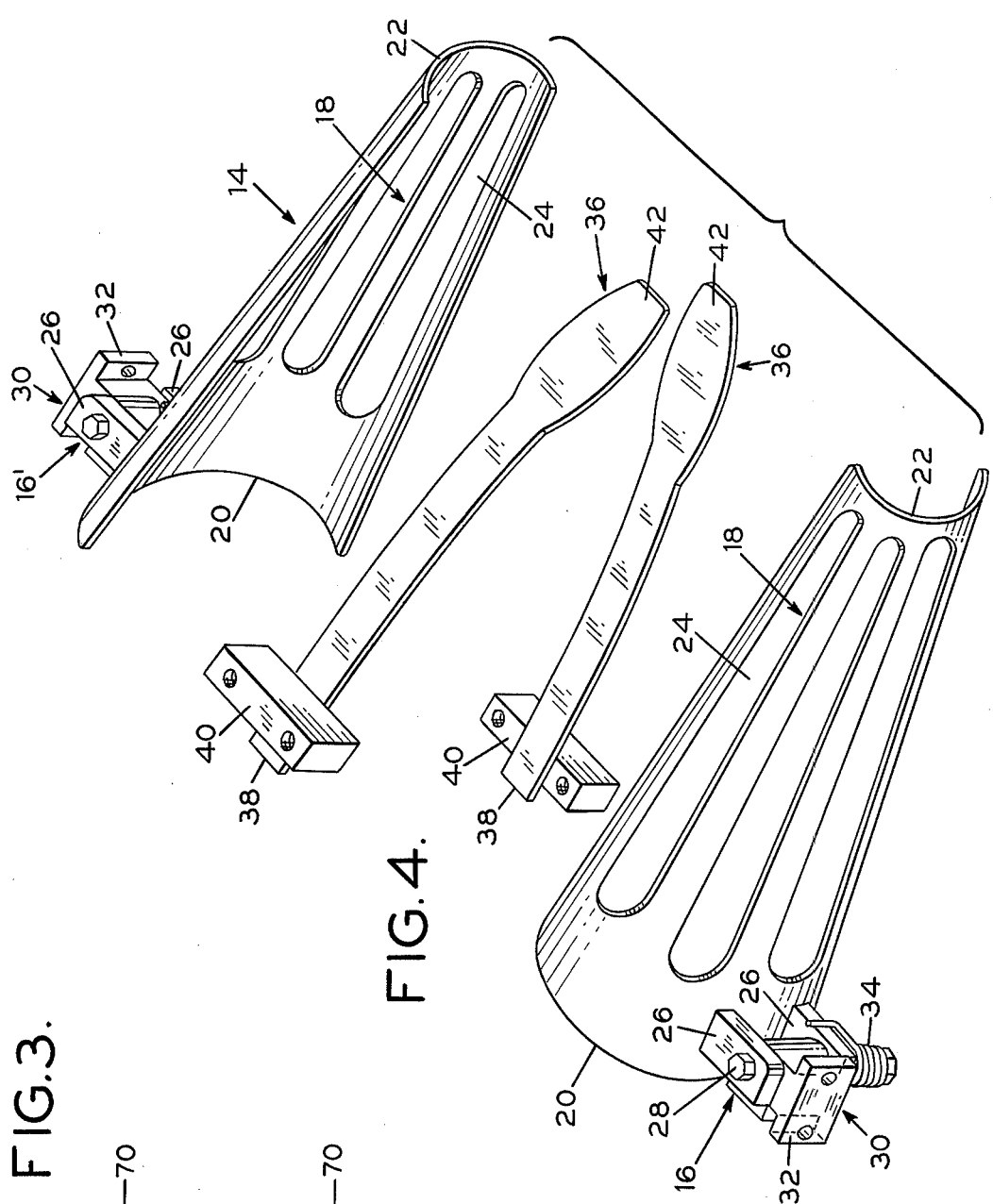

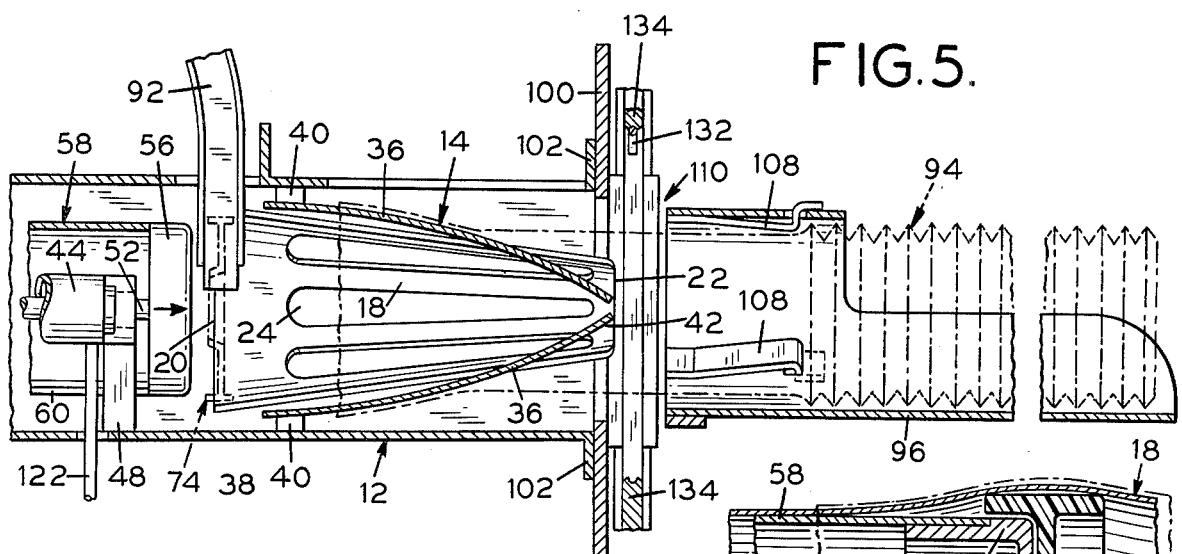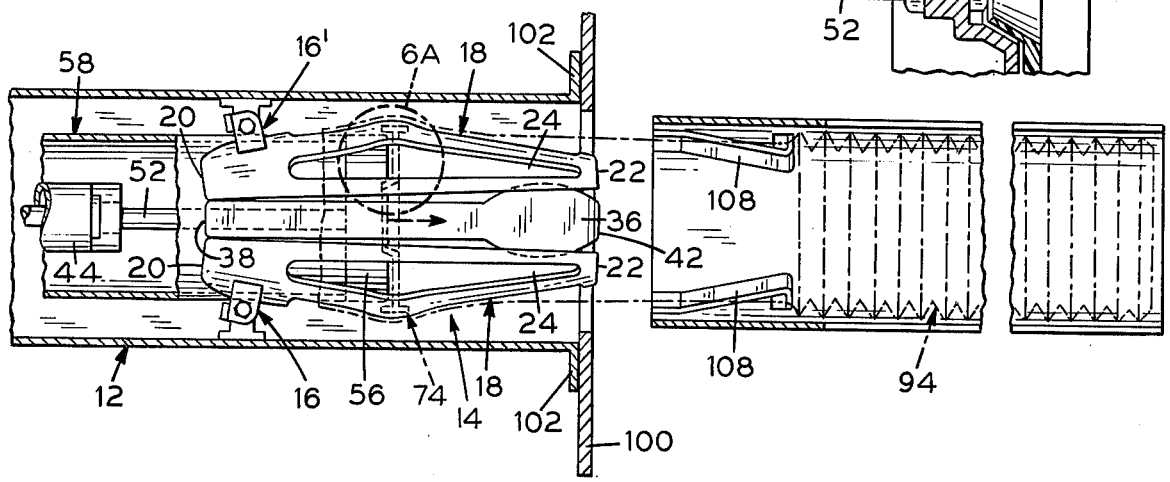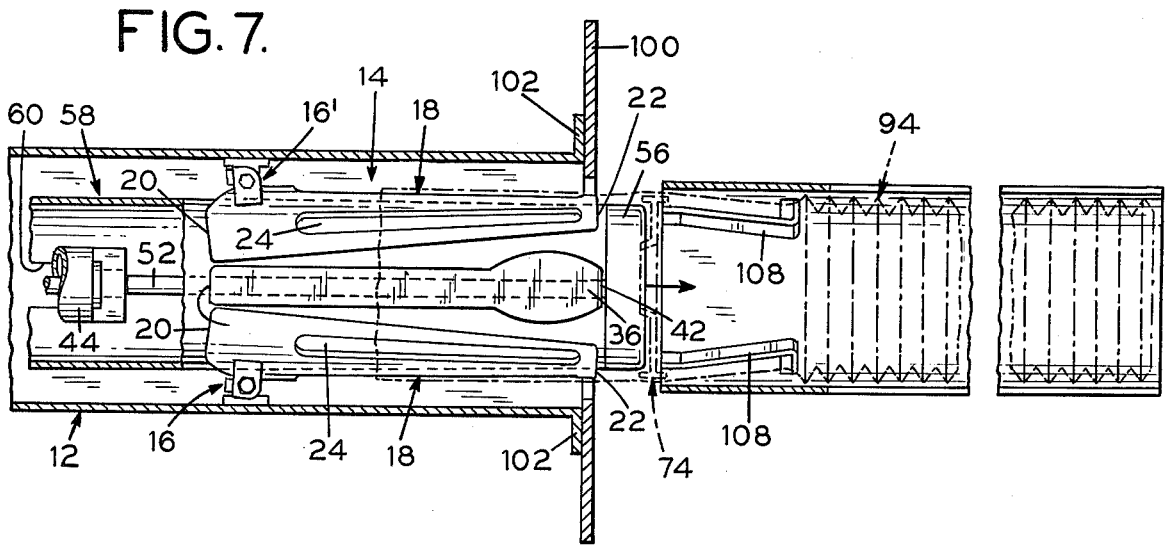

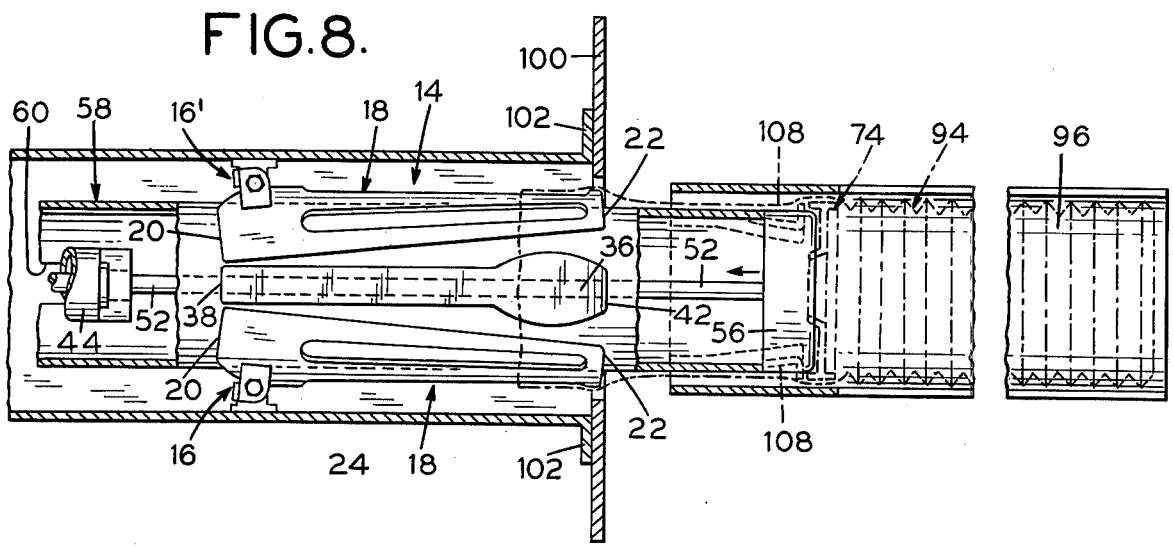
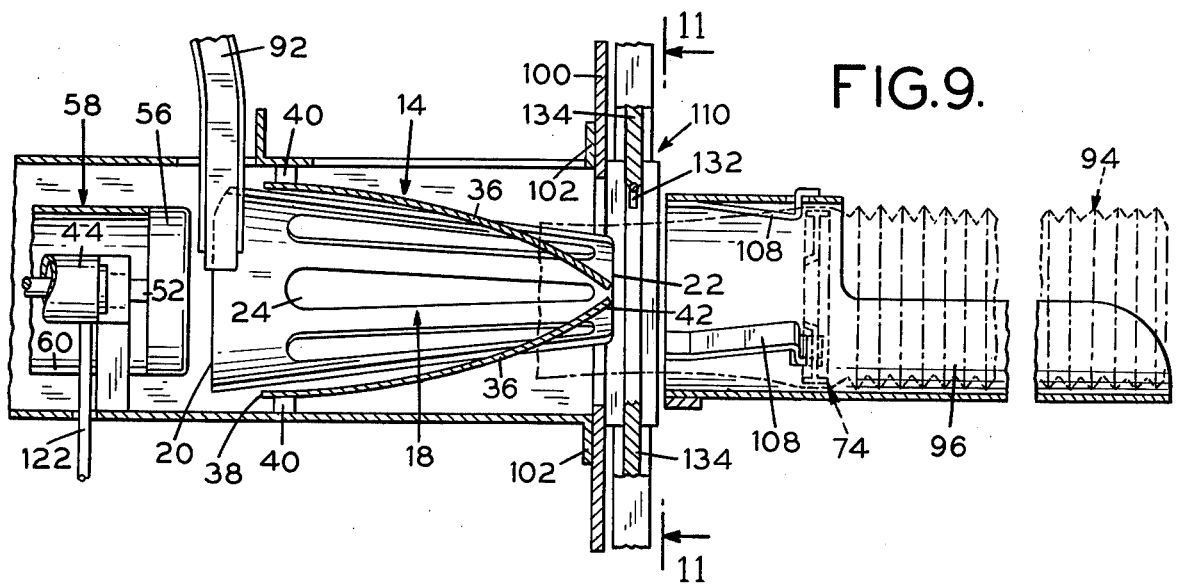
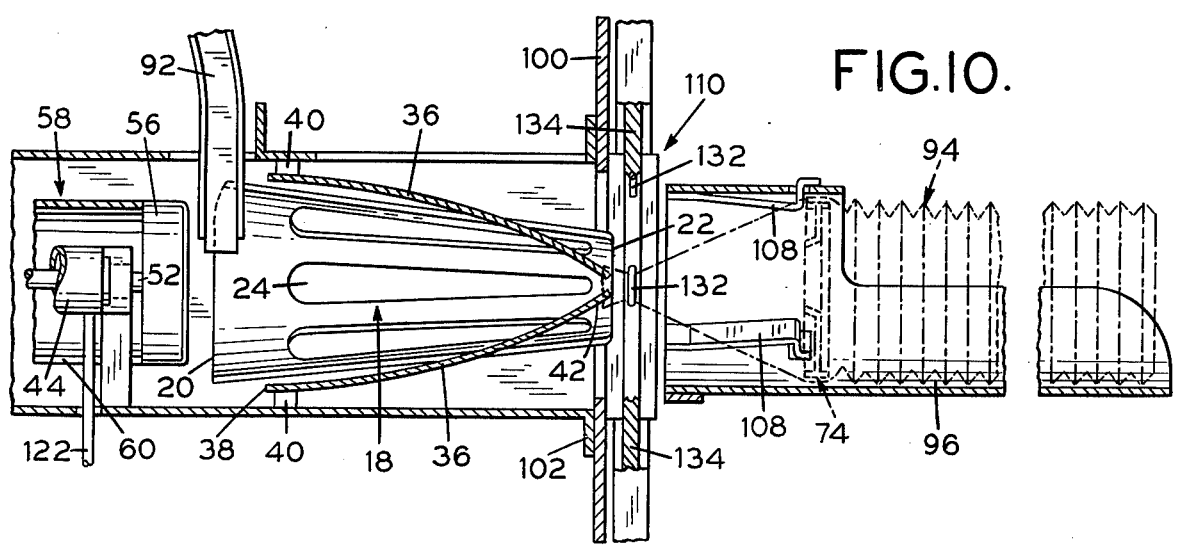

APPARATUS FOR INSERTING A SIZING DISC INTO A TUBULAR CASING

The invention relates to a method and apparatus for circumferentially stretching an unshirred end portion of a shirred tubular casing and inserting a sizing disc therein. In another aspect, the present invention relates to a method and apparatus for implanting a sizing disc into an unshirred end portion of a shirred tubular casing wherein the sizing disc has a larger external diameter than the inflated internal diameter of the unshirred end of the casing.

In the meat packing industry, techniques are known for the automatic and semiautomatic filling of various types of casings with viscous meat emulsion. In general, these techniques include positioning a shirred continuous film casing length over a stuffing horn and thereafter continuously deshirring the casing and stuffing the deshirred casing with viscous meat emulsion fed under pressure through the stuffing horn and into the casing interior. As used herein, the term casing or tubular casing is intended to mean tubing of natural or manufactured materials, and the term "casing length" is intended to mean continuous tubular casing lengths. Shirred tubular casings are also known to persons familiar with the art as "sticks", such sticks being long lengths of casing having a substantially large bore, which have been shirred and compressed into short compact self-sustaining lengths, or which may be a package of shirred and compressed casing sheathed inside a retaining sleeve. Apparatus and processes are well known in the food casing art for producing shirred tubular cellulosic food casings such as, for example, the apparatus and processes disclosed in U.S. Pat. Nos. 2,983,949 and 2,984,574 to Matecki. These apparatus may be employed in the preparation of pleated and compressed tubular casings wherein the compression ratios (unshirred to shirred stick length) are in the order of at least about 40:1 and up to about 100:1 or even greater. Using suitable food stuffing machinery, casing lengths can be stuffed and formed into unit size links of particulate or comminuted viscous materials, such as meat emulsions, or the like.

In the art of producing sausages and similar food products, the finely divided meat compositions commonly referred to as emulsions, are conventionally stuffed into the tubular casing materials of long length which, as stated above, may be of natural or manufactured materials. Large sausage products used in slicing for multislice package putup are usually made in casings which range in size from the trade designation No. 6 (101 mm. diameter) to No. 9 (129 mm. diameter). In the production of large sausage products, a clip closed end casing of precut length is first manually sheathed over the end of a stuffing horn and then stuffed with a food emulsion. The stuffed casing is then tied, twisted or clipped into predetermined unit length cylindrical packages.

The thusly stuffed and encased food emulsion is subsequently cooked and cured according to conventional processes. A large percentage of these large sausage products are thereafter sliced and packaged into units of predetermined weight and slice count for retail sale. The high speed slicing devices employed in such packaging operations are pre-set to yield a specific weight-by-slice count for use in obtaining unit packages of equal weight. Therefore an important aspect of a commercially acceptable large sausage product is that the tubular finished processed sausage product have a substantially uniform diameter from end to end and in successive pieces of the same designated size. Moreover, the diameter of the slices must be uniformly precise in order to assure that the slices will fit into the preformed rigid packaging frequently used.

Since a large sausage casing stuffed with a food emulsion has two generally hemispherical, rounded ends, these rounded ends are generally not used in producing equal weight packages and are either discarded or reworked. Thus another aspect of importance commercially, is to have a large sausage casing stuffed with uniform tight ends, to thereby minimize the amount of food product cut-off from the cylindrical portion.

Years of commercial utilization of manufactured sausage casings such as prepared from unsupported or fibrous reinforced cellulose have provided the experience for determining optimum stuffing and processing conditions for various classes of sausage product. Sausage generally needs to be encased or stuffed to "green" or unprocessed diameters that have been selected and recommended for such optimum performance. The recommended stuffing diameter for each size and type of casing has been established and tabulated in recommended operating procedures determined by the casing manufacturer for guidance of the sausage maker.

When a casing is understuffed from the recommended green diameter, the result generally is a processed product that is not uniform in diameter from end to end and from piece to piece; the product is undesirably wrinkled in appearance; and the processed sausage may have an emulsion breakdown yielding undesirable pockets of fat or liquid.

When a casing is overstuffed from the recommended green diameter, the casing may split or break apart at the stuffing station or subsequently, in transport to or in the cooking/smoking processing operations. This results in a costly waste of meat and in the labor expense for cleanup.

For many years, the apparatus and methods employed to prepare the encased food products, and particularly food products encased in large diameter casing, have relied upon manual manipulation in controlling the stuffing of food emulsion into predetermined length sausage links or packages. Recently, advances in the art have resulted in the introduction of apparatus for machine control of the stuffing operation which have provided means for preparing uniformly sized encased products such as disclosed, for example, in U.S. Pat. Nos. 2,871,508, 2,999,270, 3,264,679, 3,317,950, 3,454,980, 3,457,588, 3,553,769, 3,621,513, 3,659,317 and 3,751,764.

Although many of the prior art stuffing devices generally provide a fairly wide range of adjustment for producing stuffed casings of desired diameter, the adjustments are usually left to the judgment of the operator, thereby resulting in understuffing or overstuffing caused by deviation from the optimum size recommended by the casing manufacturer. In addition, the prior art devices do not have means for controlling the shape and tightness of stuffing for both the leading and trailing ends of the stuffed casing.

In the copending application of V. Kupcikevicius and A. L. Mika, Ser. No. 627,252 having a common assignee and which was filed on Oct. 30, 1975 there is disclosed an apparatus and method for controlling the uniformity of stuffed diameter and conformation of the terminal ends of a sausage product.

According to the disclosure of application Ser. No. 627,252 there is provided an apparatus and method for stuffing viscous food product into a shirred tubular casing article containing a casing diameter sizing means confined within an unshirred portion of one closed end.

In application Ser. No. 627,253 filed Oct. 30, 1975 and assigned to a common assignee, there is provided a prepackaged shirred tubular casing article which can be used on the apparatus of application Ser. No. 627,252 and which is a shirred casing length having an internal bore and having a sizing means confined within an unshirred portion of the casing length. The sizing means generally described as a sizing disc has an outer perimeter larger than the inner perimeter of the unshirred casing length.

The present invention is applicable for implanting the sizing disc into the tubular casing and forming the article disclosed in application Ser. No. 627,253.

Devices for stretching or expanding plastic bags to accommodate food items such as sausages, meat loaves, hams and the like are of course well known to those skilled in the art.

Thus according to U.S. Pat. No. 3,503,180, issued Mar. 31, 1970 there is disclosed an apparatus for packaging food items in elastic plastic film bags which apparatus includes means for uniformly expanding and stretching an elastic, memory-type plastic bag about its periphery and along its length so that the food item can be inserted therein.

In the U.S. Pat. No. 2,884,328 to Johnson, U.S. Pat. No. 3,181,956 to Clark and U.S. Pat. No. 3,252,267 to Myles there is disclosed apparatus which utilize two pairs of fingers to stretch and expand an elastic bag about its periphery.

When such bagging apparatus as described above is adapted for inserting a sizing disc into a casing, wherein the sizing disc has a greater external periphery than the inflated inner periphery of the casing, it has been found that such apparatus requires exertion of a very large stretching force and tends to cause casing damage or breakage since the film of a casing does not have the high degree of elasticity of a plastic film. This breakage is also due in part to the fact that such prior art devices do not, in fact, permit the uniform contacting and only local stretching of casing that surrounds the disc as the disc is inserted in the casing.

It is an object of the present invention, therefore, to provide an apparatus and method for implanting a sizing disc into an unshirred end portion of a shirred tubular casing wherein the sizing disc has a larger external periphery than the inflated inner periphery of the unshirred casing.

Another object of the present invention is to provide an apparatus for implanting a sizing disc into an unshirred end portion of a shirred tubular casing which apparatus is operable for uniformly contacting and locally stretching only unshirred casing that surrounds the disc as the disc advances through said unshirred portion.

These and other objects will become apparent when considered in the light of the following description taken in conjunction with the accompanying drawings wherein:

FIG. 3 is an end view taken along line 3—3 of FIG. 1;

FIG. 4 is an exploded view in perspective illustrating the spreader unit for guiding a sizing disc therethrough;

FIG. 5 is a schematic side elevation representation of the spreader unit with an end portion of a casing sheathed thereon and a sizing disc aligned with the plunger in retracted position;

FIG. 6 is a schematic plan view similar to FIG. 5 showing the plunger and disc advanced about one third the stroke length;

FIG. 6A is an enlarged detail in section showing the area within the dotted circle 6A of FIG. 6;

FIG. 7 is a schematic plan view similar to FIG. 6 showing the disc advanced through and clear of the spreader unit;

FIG. 8 is a schematic plan view similar to FIG. 6 showing the disc further advanced to the plunger stroke limit, the casing partly removed from the spreader unit and the disc being held in position by the latch springs;

FIG. 9 is a schematic side elevational view similar to FIG. 5 showing the plunger retracted to its starting position, the casing being self-supported about the spreader unit prior to application of the clip;

FIG. 10 is a schematic side elevational view similar to FIG. 9 showing the clip applied and the casing ready for removal.

Figure 1:
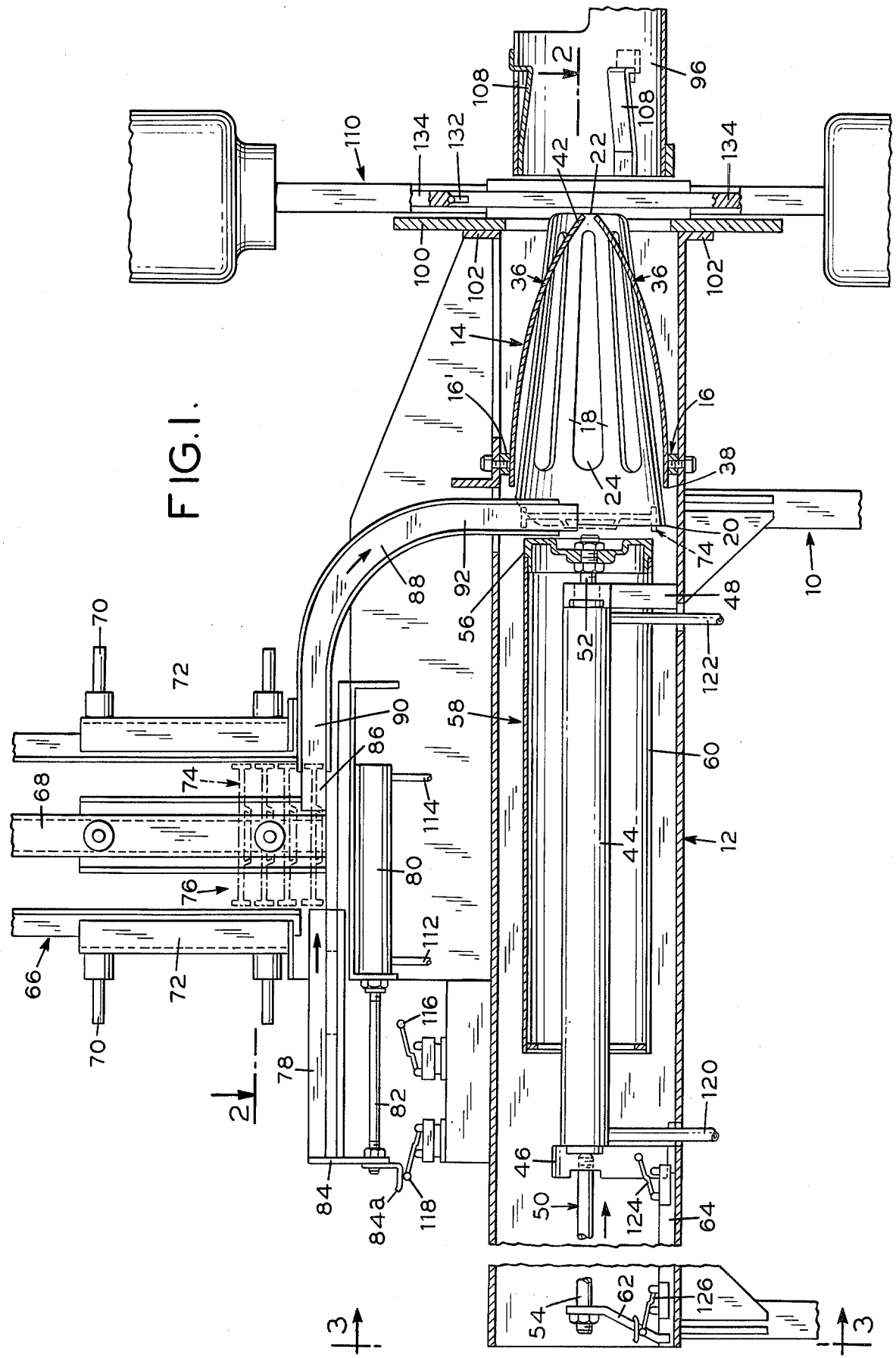
FIG. 1 is a side elevation view, partly in section of one embodiment of the invention.

In accordance with the present invention there is provided an apparatus for implanting a sizing disc into an unshirred end portion of a shirred tubular casing wherein the sizing disc has a larger external periphery than the inflated inner periphery of said unshirred casing, which comprises in combination:

a. a frame;

b. casing spreader means positioned on said frame adapted for insertion into an unshirred open end portion of a casing for expanding said unshirred end portion, being further adapted for accommodating a sizing disc advanced into said unshirred end portion of said casing, and operable for uniformly contacting and locally stretching unshirred casing that surrounds the disc as the disc advances through said unshirred portion while maintaining fore and aft portions of casing adjacent to said surrounding casing in a relaxed condition; and, c. disc advancing means for advancing a disc through said casing spreader means and into said unshirred portion of said casing.

The apparatus of the present invention may also include sizing disc storage and dispensing means adapted to store sizing discs and to sequentially dispense a sizing disc to said disc advancing means. The apparatus may further include a casing gathering and closing means for gathering and closing the unshirred end of the casing after insertion of the sizing disc in the unshirred portion of said casing.

The present invention also provides a method for implanting a sizing disc into an unshirred open end portion of a shirred tubular casing wherein the sizing disc has a larger external periphery than the inflated inner periphery of said unshirred open end portion of said casing, which comprises:

a. sheathing an unshirred open end portion of a shirred tubular casing onto a spreader means;

b. advancing a sizing disc into said spreader means and into said open end of said sheathed unshirred portion of tubular casing;

c. continuing the advancement of said sizing disc into said spreader means to thereby provide an outwardly expanding force such as to uniformly peripherally expand and locally stretch the unshirred casing portion that surrounds said sizing disc as the disc advances through the speader means and through said sheathed unshirred portion of said casing, while maintaining the contiguous portions of the unshirred casing on the fore side and aft side of said advancing disc in a relaxed condition;

d. further continuing the advancement of said sizing disc into said sheathed casing until said sizing disc exits said spreader means; and thereafter, e. applying a closure to said casing containing said implanted sizing disc to close the unshirred open end of said casing.

As used herein, the term "relaxed condition" of the casing is meant to connote a condition in which the fore and aft portions of the casing adjacent the casing overlying and surrounding the advancing sizing disc are under a substantially lesser degree of outward stretching force than the casing overlying and surrounding the advancing sizing disc.

Turning now to the drawing wherein like reference numerals denote like parts, there is shown in FIG. 1 a base frame generally designated by reference numeral 10 which supports a main frame 12.

A casing spreader means 14 is positioned on the main frame 12 which is adapted to expand an open unshirred end of a shirred tubular casing and to permit localized stretching of the unshirred end to accommodate an advancing sizing disc. The casing spreading means 14 is operable for locally stretching only the unshirred casing that surrounds the sizing disc, as the sizing disc advances through the casing. As best seen in FIG. 4, casing spreader means generally indicated by reference numeral 14 includes pivotal elements 16 and 16'.

For purposes of simplicity, corresponding or

For purposes of simplicity, corresponding or opposite hand elements or parts are given the same reference number.

Each pivotal element 16, 16' includes an arrangement of primary blades, i.e. left hand blades 18 for pivotal element 16 and right hand blades 18 for pivotal element 16'. The blades 18 are fabricated from a thin resilient flexible material, such as thin polished metal strips.

According to prior art devices, blades or fingers are utilized for expanding bags and the like as discussed previously. However the utilization of unsupported, independently resilient blades (as taught by the prior art) for implanting a sizing disc into an open end of unshirred tubular casing would not be entirely satisfactory, primarily because the elongate fingers could be permanently distorted, particularly at their outboard ends, under the influence of the great amount of the outward force required to insert the disc through the casing. In order to obviate these disadvantages, the present invention provides that the blades 18 are conjoined at their inboard ends 20 (the ends which admit the sizing disc) and at their outboard ends 22 and are arranged in a manner such as to provide a generally frusto-conical conformation to the assembly.

The pivotal elements 16 and 16' are each provided with elongated tapered apertures of slots 24 which apertures are intermediate adjacent blades 18 and are disposed intermediate end portions 20 and 22, respectively of the pivotal elements 16 and 16'.

Slots 24 provide controlled flexibility to the conjoined blades 18 particularly to their outboard ends 22 and thus to pivotal elements 16 and 16' which permit slideable advancement of a sizing disc along the inner blade surfaces.

Figure 2:
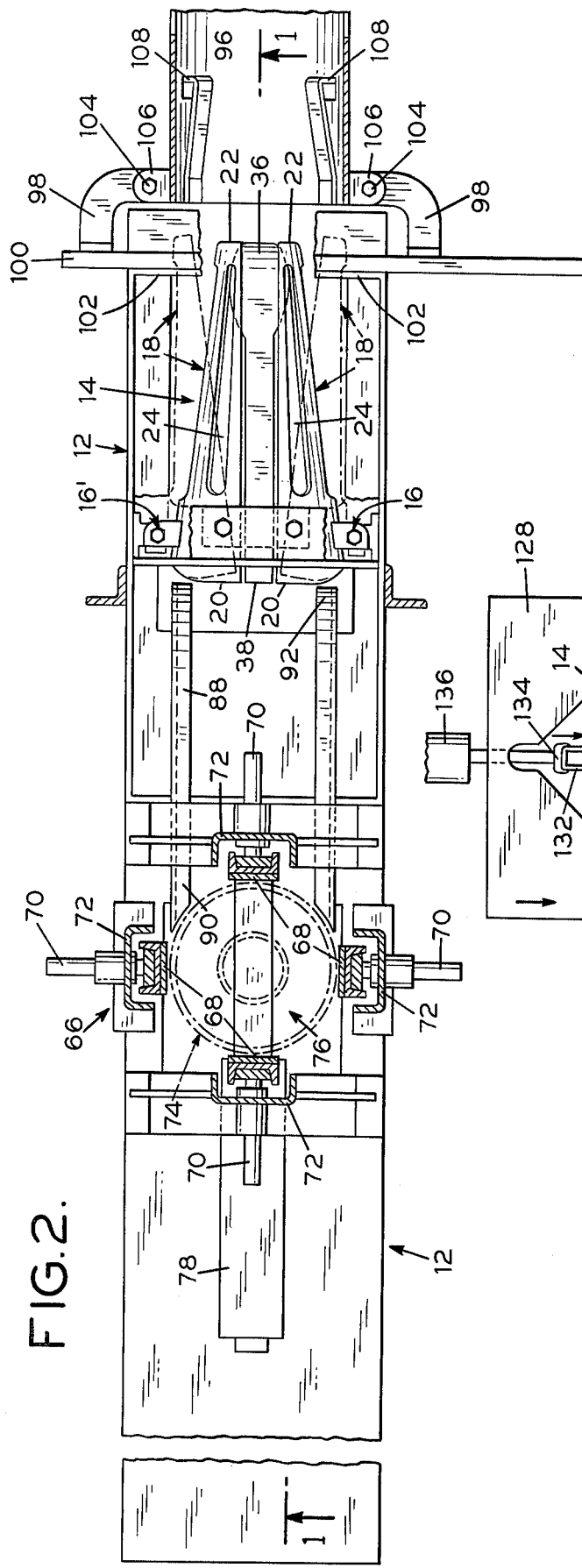
FIG. 2 is a plan view generally along line 2—2 of FIG. 1.

In the preferred embodiment, shown in FIGS. 1, 2 and 4, the pivotal elements 16 and 16' are each formed of a tapered portion of a cylinder with the radius of each outboard end 22 being substantially equal to the radius of each inboard end 20.

Because of the tapered cylindrical configuration of each pivotal element 16 and 16', and the design of the blades and apertures therebetween, the sizing disc can be advanced along the inner blade surfaces in a manner such as to progressively radially expand the spreader means 14 from a substantially conical conformation to a cylindrical conformation, and to progressively, uniformly, locally and circumferentially stretch a tubular casing sheathed thereon as will be more fully explained hereafter.

Extending from the inboard end 20 of each pivotal element 16 and 16' is a pair of brackets 26 rotatably secured by pintle 28 onto shoulder bracket 30. Shoulder 32 of bracket 30 is fastened to main frame 12. Coil springs 34 are each adapted to urge each bracket 30 inwardly and thereby urge the outboard end 22 of pivotal elements 16 and 16' toward each other.

When the pivotal elements 16 and 16' are activated as will be explained hereafter, their outboard ends 22 are urged outwardly so that the spreader means which were initially of a substantially conical configuration finally assume a generally cylindrical configuration. In their fully expanded condition, the outboard ends define an interrupted surface of a cylinder with the areas of interruption being in the upper and lower segment of the cylinder as shown in FIG. 6. For proper stretching of a shirred tubular casing, it is important that the spreader means define a substantially uninterrupted cylindrical surface as the disc approaches the outboard ends 22 of the spreader means.

For this purpose, the casing spreader means also include a pair of secondary blades, i.e. upper blade 36 and lower blade 36 which are adjustably detachably secured at their inboard ends 38 to brackets 40 which are adapted to be mounted on main frame 12.

As best seen in FIGS. 1 and 4, the secondary blades 36 are inwardly bowed so that their outboard ends 42 are disposed centrally towards the longitudinal axis of the spreader means. Since these blades are flexibly constructed in a manner such as to be self-supporting, they will maintain their relative position until urged away from each other upon the proper application of force.

In order to properly "fill in" the circumference of the outboard end of the spreader means to accommodate an advancing disc, it will be seen from FIG. 4 that the secondary blades ae wider at their outboard ends 42 than at their inboard ends 38. It is preferred that the blades 36 have their widest width at their outboard ends 42 and preferably they should be constructed so that they taper in width inwardly to the inboard ends 38. The secondary blades can be fabricated from the same type material as the primary blades. In general both primary and secondary blades can be fabricated from narrow, thin gauge, light-weight metals, metal alloys, or plastic materials, having a low coefficient of friction to facilitate movement of an advancing disc.

Situated rearward of the spreader means is disc advancement means which generally include a pneumatic cylinder, a skirt and a plunger associated with the pneumatic cylinder which is adapted to be advanced into, through and then retracted from the spreader means.

Thus, referring to FIGS. 1, 2 and 3, it will be seen that a pneumatic cylinder 44 is mounted on aft end mounting bracket 46 and fore end mounting bracket 48 each of which brackets are secured to frame 12. Pneumatic cylinder 44 is furnished with a double-end piston rod 50 having a fore end 52 and an aft end 54.

Detachably secured to the fore end 52 of piston rod 50 is a disc plunger 56 which is adapted to be urged into and through the spreader means 14. The disc plunger is in turn connected to slotted skirt tube 58 so that both the plunger 56 and slotted skirt tube 58 can be urged into and through spreader means 14. Provision for clearance of the fore end bracket 48 when piston rod 50 advances plunger 56 and skirt tube 58 through spreader means 14 is provided by means of slot 60 in skirt tube 58. The aft end 54 of piston rod 50 is adjustably connected to yoke 62 which is slideably fitted on guide member 64 secured to frame 12. Yoke 62 and guide member 64 serve as an antirotation means and maintain plunger 56 in anti-rotational alignment as it is reciprocated into and out of spreader means 14.

As best seen in FIGS. 1, 2 and 3 the apparatus of the present invention also provides sizing disc storage and dispensing means adapted to store sizing discs and to sequentially dispense a sizing disc to the disc advancing means. The sizing disc storage means include a hopper 66, and a plurality of vertically disposed hopper guide members 68 preferably four hopper guide members which are adjustably secured by rods 70 to pedestals 72 fastened to frame 12. The hopper guide members 68 are adjusted to vertically guide a stack of a plurality of sizing discs 74 in seriatim centrally into dispensing chamber 76. Situated adjacent dispensing chamber 76 is a pusher plate 78 which is slideably fitted for reciprocation into and out of disc member 76. Situated beneath the dispensing chamber 76 is an upper pneumatic cylinder 80 which is furnished with a piston rod 82 which is secured by bracket 84 to pusher plate 78 so that reciprocation of piston rod 82 causes similar movement to pusher plate 78. Thus it will be seen that actuation of upper pneumatic cylinder 80 retracts pusher plate 78 from chamber 76 thereby permitting a lowermost disc 74 of the stack of discs to drop therein. Juxtaposed with discharge port 86 of dispensing chamber 76 is a pair of disc guide troughs 88 adjustably secured to side plates of frame 12. Troughs 88 are adjusted to freely traject a sizing disc 74 advanced through discharge port 86 from dispensing chamber 76 through horizontal run 90 to vertical run 92 where the disc 74 is aligned with the inboard end of spreader means 14.

As shown in FIGS. 1, 2 and 5 provision is made for supporting and aligning a shirred casing article 94 with the axis of pneumatic cylinder 44 by means of trough 96. As shown in FIG. 2 trough 96 is releasably fastened to brackets 98 which are secured to clipper mount plate 100. Clipper mount plate 100 is in turn connected to side plates 102 extending from the fore ends of frame 12. Brackets 98 mount studs 104 for slideably engaging trough brackets 106 secured to trough 96. Spring latches 108, which are flexibly secured to the tubular portion of trough 96 are adapted to pass a sizing disc 74 implanted in casing 94 advanced therein and to restrain reverse movement thereof when disc plunger 56 is retracted. Trough 96 can be fabricated as directed or required to accommodate casings of varying size.

Also mounted on clipper mount plate 100 is a clip closing means shown generally as 110. The clip closing means is conventional in the art and hence no detailed description is necessary. In general the clip closing means includes a conventional casing gathering and clip closing device. Movement of the clip closure is sequentially timed by means of control elements (not shown) activating a pneumatic cylinder (not shown).

The sizing disc 74 which can be employed in the present invention can be of a generally annular configuration and is provided with a central opening for mounting the disc onto a stuffing apparatus. The sizing disc can be fabricated from any material capable of withstanding the stresses imposed upon it during operation. Merely as illustrative, the sizing disc can be fabricated from a metal such as stainless steel or a plastic such as polyethylene, nylon, polytetrafluoroethylene, and like materials. A preferred type of sizing disc for use in the present invention is disclosed in the copending application of V. Kupcikevicius and A. L. Mika, Ser. No. 635,275 filed on Nov. 26, 1975 and entitled "Presizing Disc With Self-Locking Means."

A typical operation of the apparatus of the present invention will now be described and can be more readily understood when taken together with the accompanying drawing. Prior to start-up, the hopper 66 is loaded with sizing discs and a sizing disc is positioned in dispensing chamber 76 adjacent pusher plate 78. A shirred tubular casing 94 is positioned in trough 96 and is partly deshirred at one end. The resulting unshirred end is thereafter sheathed over and about the outboard ends of the casing spreader means 14 with the unshirred end sheathed on about ¾ the length of the pivotal elements 16, 16'.

Upon start-up pneumatic cylinder 80 is energized by conventional means. Air is introduced into rod end port 112 thereby actuating piston rod 82 causing it to retract into cylinder 80. Pusher plate 78 is advanced through dispensing chamber 76 and urges a sizing disc 74 through discharge port 86 into disc guide trough 88. The sizing disc 74 traverses horizontal run 90 and vertical run 92 and is ultimately positioned adjacent disc plunger 56 in alignment with the spreader means 14 as shown in FIG. 5. Actuation of piston rod 82 causes bracket extension 84a to contact and actuate limit switch 116 thereby reversing the air pressure from rod end port 112 to head end port 114. This reverses the travel of piston rod 82 and advances it to its original starting position whereupon bracket extension 84a contacts and actuates limit switch 118. By appropriate conventional pneumatic controls (not shown) this results in actuation of pneumatic cylinder 44 causing air to enter pneumatic cylinder 44 through cylinder extending port 120. As a result, the fore end 52 of piston rod 50, the attached disc plunger 56 and slotted skirt tube 58 to which it is connected are advanced. The disc plunger 56 thereby contacts sizing disc 74 and urges it into spreader means 14 as shown in FIG. 6. As will be seen from FIGS. 6 and 6A, the advancing disc 74 is urged into the spreader means 14 and as a result, the casing sheathed on the spreader means is uniformly contacted and locally stretched with the greatest stretching force being applied only to the casing surrounding the disc as the disc advances through the spreader means.

As will be further seen from FIG. 6, fore and aft portions of the spreader means and casing, contiguous with the disc, are in a substantially relaxed condition, i.e. not subject to the localized stretching stress required for inserting the disc into the casing.

The disc plunger 56, slotted skirt tube 58 and sizing disc 74 continue their movement through the spreader means 14 and as the disc approaches and reaches the outboard ends of the spreader means, the upper and lower blades 36 are now in position to fill-in the circumference of the outboard end of the spreader means 14.

Referring to FIG. 7, it will be seen that the disc has now cleared the spreader means 14 and the disc is positioned immediately in front of the spring latches 108. The pivotal elements 16 and 16' are prevented from collapsing to their original position because of slotted skirt tube 58 which maintains the pivotal elements in their substantially expanded condition.

As shown in FIG. 8, the disc plunger continues to advance until it reaches the limit of stroke of double end piston rod 50. The tubular casing 94 is now partly removed from the spreader unit and the sizing disc 74 is held in position by spring latches 108. Control of the advance of double end piston rod 50 and thus disc plunger 56, is determined by limit switch retract 124. Thus as yoke 62 contacts limit switch retract 124, the air pressure from extending port 120 is reversed to retracting port 122. This reverses the travel of piston rod 50, retracting it to its original starting position carrying with it the disc plunger 56, slotted skirt tube 58; and thus permitting collapse of the spreader unit 14 as shown in FIG. 9. Upon retraction of piston rod 50, yoke 62 contacts and actuates limit switch 126. By appropriate conventional pneumatic controls (not shown) this results in actuation of clip closing means 110.

Figure 11:
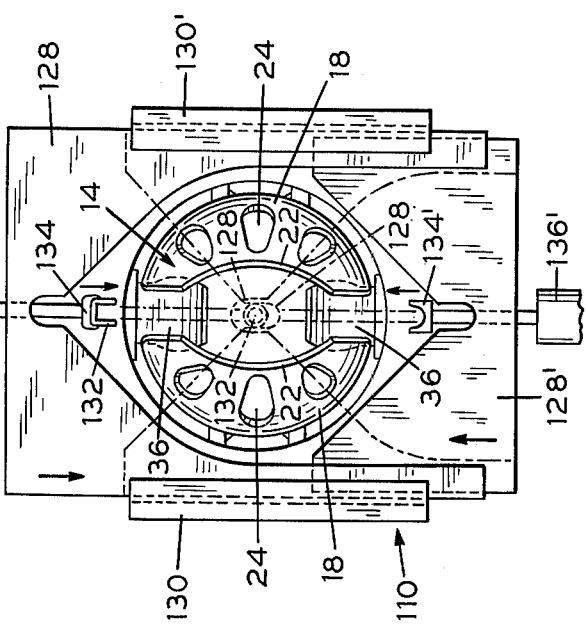
FIG. 11 is a view taken along the line 11—11 of FIG. 9 showing the V shaped casing gathering means prior to clipping.

As shown in FIG. 11, actuation of the clip means 110 causes the gathering plates 128—128' to converge by pneumatic cylinders (not shown) along tracks 130—130' towards each other to the position shown in phantom carrying with them the gathered end of the unshirred end of the shirred tubular casing. By means of conventional limit switches (not shown), the clipper elements 134—134' are activated by pneumatic cylinders 136—136' and a clip 132 is applied to the gathered unshirred end of the casing as shown in FIG. 10.

After application of clip 132, the article can thereafter be removed from the apparatus and another shirred tubular casing can be inserted in trough 96 and the procedure previously explained repeated to start a new cycle.

The apparatus of the invention is adapted to accommodate a range of casing and disc sizes by the readily adjustable components comprising the sizing disc storage and dispensing means, the sizing disc 74 and disc guide trough 40; and by the interchangeable components for different sizes of casing comprising the disc plunger 56, skirt tube 58, pivotal elements 16, 16', and casing trough 96. Merely as illustrative, No. 8 Fibrous casing available from Union Carbide Corporation has a diameter size range of 4.01 inch (10.19 cm.) to 4.20 inch (10.67 cm.). The shirred No. 8 Fibrous casing is used with a sizing disc 74 having a diameter of 4.61 inch (11.71 cm.) which is inserted by the apparatus of the invention into a deshirred portion of the casing a distance of about 6 inches (15.2 cm.) and clip closed at the casing end.

What is claimed is:

1. An apparatus for implanting a sizing disc into an unshirred open end portion of a shirred tubular casing wherein the sizing disc has a larger external periphery than the inflated inner periphery of said unshirred casing which, comprises in combination:
    a. a frame;
    b. casing spreader means positioned on said frame adapted for insertion into an unshirred open end portion of a casing for expanding said unshirred end portion, being further adapted for accommodating a sizing disc advanced into said unshirred end portion of said casing, and operable for uniformly contacting and locally stretching unshirred casing that surrounds the disc as the disc advances through said unshirred portion while maintaining fore and aft portions of casing adjacent to said surrounding casing in a relaxed condition; and,
    c. disc advancing means for advancing a disc through said casing spreader means and into said unshirred portion of said casing.

2. Apparatus according to claim 1 further including a casing gathering and closing means for gathering and closing said deshirred end of the casing after insertion of said sizing disc in said deshirred portion of said casing.

3. Apparatus according to claim 1 wherein said casing spreader means include pivotal elements having inboard and outboard ends, said pivotal elements being pivotally mounted to said frame on each inboard end, each of said pivotal elements having an arrangement of primary blades which are conjoined at the inboard and outboard ends of said pivotal elements.

4. Apparatus according to claim 3 wherein each of said pivotal elements is provided with a slot disposed intermediate adjacent blades and intermediate said outboard and inboard ends.

5. Apparatus according to claim 3 wherein said pivotal elements in collapsed condition generally define a frusto conical configuration.

6. Apparatus according to claim 1 wherein said spreader means include a pair of secondary blades mounted to said frame intermediate said pivotal elements.

7. Apparatus according to claim 6 wherein said secondary blades include inboard and outboard ends and are mounted to said frame at their inboard ends.

8. Apparatus according to claim 7 wherein said secondary blades are inwardly bowed so that their outboard ends are disposed centrally towards the longitudinal axis of said spreader means.

9. Apparatus according to claim 8 wherein said secondary blades are wider at their outboard ends than at their inboard ends.

10. Apparatus according to claim 3 wherein said pivotal elements form a tapered portion of a cylinder with the radius of the inboard end of each pivotal element substantially equal to the radius of its outboard end.

11. Apparatus according to claim 10 wherein said pivotal elements when in expanded condition generally define a cylindrical configuration.

12. Apparatus according to claim 11 wherein said pivotal elements when in expended condition define the interrupted surface of a cylinder, said surface being interrupted in the upper and lower portions of the cylinder.

13. Apparatus for implanting a sizing disc into an unshirred open end portion of a shirred tubular casing wherein the sizing disc has a larger external periphery than the inflated inner periphery of said unshirred casing, which comprises in combination:
   a. a frame;
   b. casing spreader means positioned on said frame adapted for insertion into an unshirred open end portion of a casing for expanding said unshirred end portion, being further adapted for accommodating a sizing disc advanced into said unshirred end portion of said casing, and operable for uniformly contacting and locally stretching unshirred casing that surrounds the disc as the disc advances through said unshirred portion while maintaining fore and aft portions of casing adjacent to said surrounding casing in a relaxed condition, said spreader means including pivotal elements having inboard and outboard ends, each of said pivotal elements having an arrangement of flexible primary blades which are conjoined at the inboard and outboard ends of said pivotal elements and said pivotal elements further including slots disposed intermediate said outboard and inboard ends, and said spreader means further including means for filling in the circumferential periphery of said outboard ends when said pivotal elements are in an expanded condition;
   c. disc advancing means for advancing a disc through said casing spreader means and into said unshirred portion of said casing, and
   d. sizing disc storage and dispensing means adapted to store sizing discs and to sequentially dispense a sizing disc to said disc advancing means.

14. Apparatus according to claim 13 wherein said means for filling in the circumferential periphery of said outboard ends of said pivotal elements include upper and lower blades having inboard and outboard ends and being mounted on said frame at their inboard ends and being disposed intermediate said pivotal elements.

15. Apparatus according to claim 14 wherein said upper and lower blades are inwardly bowed so that their outboard ends are disposed centrally towards the longitudinal axis of said spreader means.

16. Apparatus according to claim 15 wherein said upper and lower blades are wider at their outboard ends than at their inboard ends.

17. Apparatus according to claim 16 wherein said upper and lower blades are adapted to be urged outwardly to fill in the circumferential periphery of said outboard ends of said pivotal elements when a sizing disc is advanced through said outboard ends.

18. Apparatus according to claim 13 wherein said disc advancing means includes a first pneumatic cylinder, a skirt, and a plunger associated with said pneumatic cylinder, and wherein said plunger is adapted to be advanced into and through said spreader means, and is adapted to be thereafter retracted from said spreader means.

19. Apparatus according to claim 18 wherein said skirt is connected to said plunger and is adapted to be advanced into said spreader means with said plunger, and is further adapted to maintain said spreader means in an expanded condition when said plunger exits the outboard end of said spreader means.

20. Apparatus according to claim 13 wherein said sizing disc storage and dispensing means includes a plurality of adjustable vertically disposed hopper guide members which are adapted to accommodate a plurality of sizing discs, a dispensing chamber, a pusher plate slideably fitted for reciprocation into and out of said dispensing chamber, and means for reciprocating said pusher plate into and out of said chamber.

21. Apparatus according to claim 20 wherein said means for reciprocating said pusher plate into and out of said chamber includes a pneumatic cylinder associated with said pusher plate.

22. Apparatus according to claim 20 wherein said sizing disc storage and dispensing means further include troughs adapted to freely traject a sizing disc from said dispensing chamber into alignment with said spreader means.

23. Apparatus according to claim 13 further including a casing gathering and closing means for gathering and closing said unshirred open end of said casing.

24. A method for implanting a sizing disc into an unshirred open end portion of a shirred tubular casing wherein the sizing disc has a larger external periphery than the inflated inner periphery of said unshirred open end portion of said casing, which comprises:
   a. sheathing an unshirred open end portion of a shirred tubular casing onto a spreader means;
   b. advancing a sizing disc into said spreader means and into said open end of said sheathed unshirred portion of tubular casing;
   b. continuing the advancement of said sizing disc into said spreader means to thereby provide an outwardly expanding force such as to uniformly peripherally expand and locally stretch the unshirred casing portion that surrounds said sizing disc as the disc advances through the spreader means and through said sheathed unshirred portion of said casing, while maintaining the contiguous portions of the unshirred casing on the fore side and aft side of said advancing disc in a relaxed condition;
   d. further continuing the advancement of said sizing disc into said sheathed casing until said sizing disc exits said spreader means; and thereafter,
   e. applying a closure to said casing containing said implanted sizing disc to close the unshirred open end of said casing.

\* \* \* \* \*